Patented Jan. 4, 1938

2,104,637

UNITED STATES PATENT OFFICE 2,104,637

METHOD OF COATING

Kenneth E. Crooks, Williamsport, Pa.

No Drawing. Application July 19, 1935,
Serial No. 32,302

1 Claim. (Cl. 91—68)

This invention relates to a method of coating surfaces and more particularly to a method of coating porous surfaces, such as wood surfaces and the like, the object being to provide a method by means of which a priming or initial coating of waterproof penetrating compositions can be applied to a porous surface and then a coating of composition which has an affinity for the initial or priming coat so that a homogeneous coating will be formed on the product.

Another object of my invention is to provide a method in which material is first treated to make it waterproof and then dried to provide the surface and the pores thereof with gelatinized China-wood oil or tung oil to which the waxy coating composition adheres and grows together so as to give the product a coating of wax which not only coats the surface but fills the pores and provides a surface very resilient and which has great wearing qualities.

My improved method is especially adapted to be used for coating flooring in the manufacture of prefinished flooring whereby the use of customary fillers and varnish is eliminated and the product is given an initial coating of waterproof material and then a coating of wax in order to provide the proper wearing surface for the flooring.

Other and further objects and advantages of the invention will be hereinafter set forth and the novel features thereof defined by the appended claim.

In carrying out my method, the lumber from which the product is manufactured is first dried to a selected moisture content and when in a dry condition, the product is given a coating of waterproof penetrating composition which is composed of a solvent and an oil that dries by polymerization and allowed to dry and then a coating of waxy composition is applied to the surface by pressure in order to completely fill the pores and coat the surface of the product.

My improved waterproof penetrating composition contains as its essential constituents an oil, such as China-wood or tung oil, a solvent and a drier and as this coating composition dries, the tung oil gelatinizes to form crystal like particles on the surface and in the pores of the wood to which the waxy coating composition adheres and has an affinity therefor to form a homogeneous coating for the finished product.

I wish it to be clearly understood that I do not wish to limit myself to forming the penetrating composition in the exact manner described as my invention consists broadly in forming a penetrating composition of an oil that dries by polymerization and a liquid hydrocarbon so that when applied to a porous surface and dried, the tung oil gelatinizes to form a rough surface in the pores as well as on the surface of the product for the application of wax.

The waxy composition may be composed of any one of the following waxes: Beeswax, candelilla wax, carnauba wax and a synthetic wax or gum, a solvent, drier and coloring matter or a combination of any one or more of the above ingredients and therefore I do not wish to limit myself to the use of any particular kind of wax or the method of forming the same.

The wax is preferably made into a solid cake or mass and fused by an applicator or may be otherwise fused to place it in semi-plastic condition which enables it to be forced against the surface and into the pores of the material under pressure to cause this material to be filled and given a coating of wax which will completely coat the material and remain in the pores and on the surface under all conditions, or the wax can be applied in liquid form to produce a satisfactory finish for certain purposes, at greatly reduced costs.

The coating of waterproof penetrating composition can be applied by brushing the same thereon or by spraying the same thereon and therefor I do not wish to limit myself to any particular manner of applying the coating of waterproof composition so long as the product is first dried to a selected moisture content to receive the penetrating composition.

In coating products formed of certain kinds of wood, such as yellow pine and fir, I have found that the liquid wax could be used successfully to coat the same and that a coating of liquid wax can be applied with less expense than the coating of semi-plastic wax, therefore I do not wish to limit myself to the application of any particular kind of wax or the consistency of the same so long as the wax has an affinity for the gelatinized China-wood or tung oil.

The initial coating composition is preferably formed of a liquid hydrocarbon, China-wood oil or tung oil and the final coat of a wax composed of one or a series of waxes or a synthetic wax in order to allow the two coatings to form a homogeneous coating for the product which will coat the surface and fill the pores of the wood.

While in the specification I have described the liquid penetrating coating composition for initially coating the product formed of China-wood or tung oil, a solvent and a drier, the initial coating composition can be formed of other oils and a liquid hydrocarbon and the final coating composition can be formed of a single or a synthetic waxy composition or other composition which will have an affinity for the initial coating composition and therefore I do not wish to limit myself to the exact material used.

From the foregoing description it will be seen that I have provided a method of coating a product which can be varied to suit the nature of the material from which the product is formed as I have found that in coating a product formed of a more porous wood such as oak, a better product will be formed by using a semi-plastic wax and forcing the same into the pores of the wood by pressure, while with a less porous wood, such as maple, fir or pine, a liquid wax can be used without pressure in order to produce a product with a coating which has a great wearing quality.

What I claim is:

A method of coating wood products consisting in initially applying to a dry product a coating of waterproof penetrating liquid composition containing as one of its constituents China-wood oil, drying said product to gelatinize the China-wood oil to form a rough surface on the surface of the product and in the pores of the product and finally coating said product with a composition having as one of its essential constituents a wax containing a solvent, a drier and coloring matter, said wax having an affinity for China-wood oil to form a homogeneous coating for the product.

KENNETH E. CROOKS.